75142  James R. Finch's Grain Drill.
PATENTED
MAR 3 1868
Fig. 1
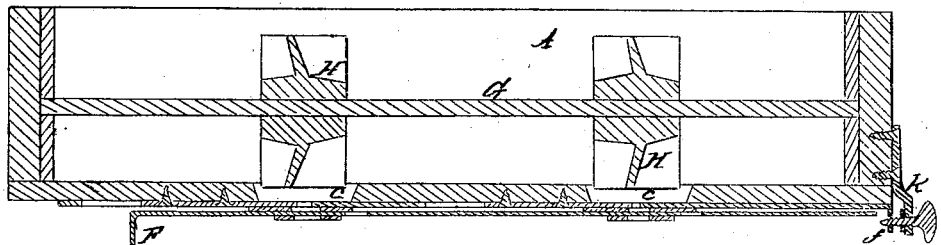
Fig. 2
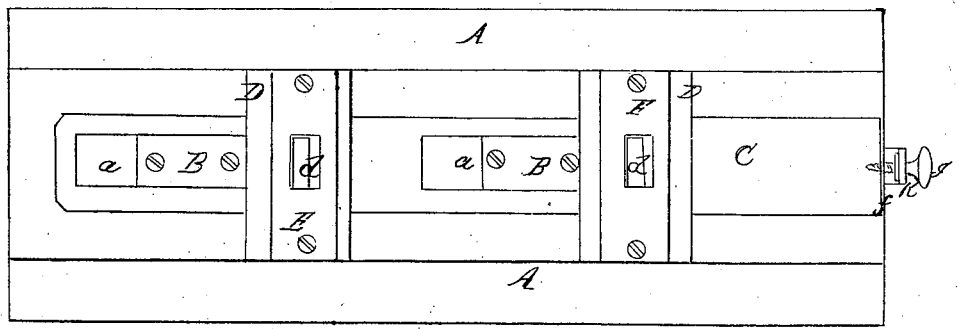
Fig. 3   Fig. 4
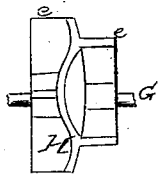 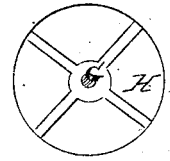
Witnesses.
U. D. Stockbridge
R. Nyman
Inventor:
James R. Finch
per
Alexander D. Mason

United States Patent Office.

JAMES R. FINCH, OF DAYTON, OHIO.

Letters Patent No. 75,142, dated March 3, 1868.

---

IMPROVEMENT IN GRAIN-DRILLS.

---

*The Schedule referred to in these Letters Patent and making part of the same.*

---

TO ALL WHOM IT MAY CONCERN:

Be it known that I, JAMES R. FINCH, of Dayton, in the county of Montgomery, and in the State of Ohio, have invented certain new and useful Improvements in Grain-Drills; and do hereby declare that the following is a full, clear, and exact description thereof, reference being had to the accompanying drawings and the letters of reference marked thereon.

In the annexed drawings, making a part of this specification, A represents a rectangular grain-box, of any desired dimensions, provided with holes or slots $c\ c$ through the bottom, and having the metallic plates B B screwed thereto, one end of said plates coming nearly even with the centre of the holes or slots $c\ c$. C represents a long metallic movable plate, provided with slots $a\ a$, equal in width and somewhat longer than the plates B B, and with a flange, $f$, which is provided with a female screw, in which works the set-screw $g$. The plate C is adjusted so that the plates B B fit into the slots $a\ a$, and is held in place, close to the bottom of the box A, by means of the slotted plates D, which are placed across the plate C, and screwed through risers, of equal thickness with the said plate C, to the bottom of the box A. The set-screw $g$, sustained by the arm K, works the plate C backward and forward, and sets it so as to give any required width and size to the opening or slot in the bottom of the box A, or to close the same entirely. When the hole or slot is entirely closed, the upper surfaces of the plates B and C, being in the same plane, make a perfectly level or even surface in the bottom of the box A, under the zigzag wheel or agitator H. F represents a movable metallic gauge or shut-off, provided with suitable slots, which may be used as a vibrating or as an adjustable gauge, and is held in place by the plates E E, which are provided with slots $d\ d$, which correspond with slots in the plate D and the hole $e$ in the bottom of the grain-box A. G represents a shaft, adjusted in the grain-box A, and attached in a suitable manner by gearing to the drive-wheel, and having the zigzag wheels or agitators H attached thereto directly over the holes $c\ c$, to agitate the grain and clear away any dirt or other foreign substance that might otherwise collect or clog up the passage through the holes $c\ c$ and slots $d\ d$. The wheels or agitators H are provided with flanges or paddles $e\ e$, for the purpose of more effectually agitating the grain that may be in the grain-box A.

Having thus fully described my invention, what I claim as new, and desire to secure by Letters Patent, is—

1. The flanges $e\ e$, in combination with the zigzag wheel or agitator H, substantially as and for the purpose specified.

2. The arrangement of the plates B B with the movable plate or shut-off C attached to the bottom of the grain-box A, substantially as and for the purpose set forth.

In testimony that I claim the foregoing, I have hereunto set my hand, this 7th day of December, 1867.

JAMES R. FINCH.

Witnesses:
F. TSCHUDI,
THOS. D. MITCHELL.